United States Patent
Fleming

(10) Patent No.: US 11,370,051 B2
(45) Date of Patent: Jun. 28, 2022

(54) TIME-BASED SHORT CIRCUIT RESPONSE

(71) Applicant: LINCOLN GLOBAL, INC., Santa Fe Springs, CA (US)

(72) Inventor: Daniel Fleming, Cleveland, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 296 days.

(21) Appl. No.: 16/548,159

(22) Filed: Aug. 22, 2019

(65) Prior Publication Data

US 2020/0130088 A1 Apr. 30, 2020

Related U.S. Application Data

(60) Provisional application No. 62/752,423, filed on Oct. 30, 2018.

(51) Int. Cl.
*B23K 9/09* (2006.01)
*B23K 9/095* (2006.01)
*B23K 9/067* (2006.01)

(52) U.S. Cl.
CPC ............ *B23K 9/0953* (2013.01); *B23K 9/067* (2013.01); *B23K 9/091* (2013.01)

(58) Field of Classification Search
CPC ...... B23K 9/0953; B23K 9/067; B23K 9/091; B23K 9/095; B23K 9/092; B23K 9/04; B23K 9/09; B23K 9/0738; B23K 9/0282
See application file for complete search history.

(56) References Cited

U.S. PATENT DOCUMENTS

| | | | | |
|---|---|---|---|---|
| RE33,330 E | * | 9/1990 | Ogasawara | B23K 9/0956 219/130.21 |
| 5,495,091 A | * | 2/1996 | Tabata | B23K 9/092 219/130.51 |
| 5,824,991 A | * | 10/1998 | Mita | B23K 9/092 219/130.51 |
| 5,866,873 A | | 2/1999 | Wang | |
| 6,501,049 B2 | * | 12/2002 | Stava | B23K 9/09 219/137 PS |
| 6,617,549 B2 | | 9/2003 | Ihde | |
| 7,173,214 B2 | | 2/2007 | Nadzam | |
| 7,767,933 B2 | | 8/2010 | Matus | |
| 7,842,903 B2 | * | 11/2010 | Myers | B23K 9/1062 219/130.51 |
| 8,049,140 B2 | | 11/2011 | Kawamoto et al. | |
| 8,431,864 B2 | | 4/2013 | Hutchison | |
| 8,723,081 B2 | | 5/2014 | Hongu | |
| 9,415,458 B2 | * | 8/2016 | Doyle | B23K 9/0282 |
| 9,895,760 B2 | * | 2/2018 | Peters | B23K 9/092 |

(Continued)

OTHER PUBLICATIONS

Auto-Axcess Systems; Issued Oct. 2015; Index No. AU/8.0; Distributed by Miller Electric Mfg. Co. Copyright 2015.

(Continued)

*Primary Examiner* — Brian W Jennison
(74) *Attorney, Agent, or Firm* — Tucker Ellis LLP; Brad C. Spencer

(57) ABSTRACT

A time-based short circuit response is employed when a short circuit event occurs during a welding process. When short circuit occurs, a time until a predetermined event in the welding process is determined. Based on the time remaining before the predetermined event, a particular short circuit response is executed.

13 Claims, 6 Drawing Sheets

(56) References Cited

U.S. PATENT DOCUMENTS

| | | |
|---|---|---|
| 2006/0213891 A1 | 9/2006 | Stava |
| 2009/0152252 A1* | 6/2009 | Kawamoto ............ B23K 9/092 219/130.51 |
| 2015/0343549 A1 | 12/2015 | Henry |
| 2018/0021872 A1 | 1/2018 | Smith |
| 2018/0214966 A1 | 8/2018 | Peters |
| 2018/0214967 A1 | 8/2018 | Peters |
| 2018/0214968 A1 | 8/2018 | Peters |
| 2018/0214969 A1 | 8/2018 | Fleming |

OTHER PUBLICATIONS

Stauffer, Greg; Advanced Functions of Arc-Welding Wire Feeders and Controls; 4 pages; Jun. 1, 2017.
Lincoln Electric; Rapid Arc Weld Process Guide; 11 pages.
Praveen, P.; Kang, M.J.; Yarlagadda, K.D.V.P.; Characterization of dynamic behaviour of short circuit in pulsed Gas Metal Arc Welding of aluminum; vol. 14, Issue 1-2; Jan.-Feb. 2006; 8 pages: Copyright by International OCSCO World Press; All Rights Reserved. 2006.
Extended European Search Report from Corresponding European Application No. 19206298.2; dated Mar. 24, 2020; pp. 1-6.

* cited by examiner determine an amount of time remaining before a target event of the welding waveform, and signal the waveform generator to modify the welding waveform to execute a short circuit response based on the amount of time remaining.

According to another aspect, a method is provided that includes detecting a short circuit condition between an electrode and a workpiece during a welding process performed in accordance with a welding waveform. The method also includes determining a time between detection of the short circuit condition and a reference event of the welding waveform. Further, the method includes selecting a short circuit response based on the time determined and executing the short circuit response selected.

According to yet another aspect, a welding device is provided. The welding device includes a waveform generator configured output a welding waveform for a welding process and a power supply configured to provide a welding power output to an electrode. The power supply modulates the welding power output based on the welding waveform from the waveform generator. The welding device also includes a short circuit response circuit configured to output a shorting response for clearing a short circuit between the electrode and a workpiece and at least one feedback circuit configured to measure at least one characteristic of the welding power output and generate a corresponding feedback signal. The welding device includes a controller configured to detect a short circuit condition based at least in part on the feedback signal from the at least one feedback circuit, determine a time remaining before a target event of the welding waveform, select a short circuit response based on the time remaining, and signal the short circuit response circuit to exceed the short circuit response selected.

These and other aspects of this invention will be evident when viewed in light of the drawings, detailed description and appended claims.

TIME-BASED SHORT CIRCUIT RESPONSE

CROSS-REFERENCE TO RELATED APPLICATIONS

This application is a non-provisional of and claims priority to U.S. Provisional Patent Application Ser. No. 62/752,423, filed Oct. 30, 2018. The entirety of the aforementioned application is incorporated herein by reference.

TECHNICAL FIELD

In general, the present invention relates to arc welding using a gas metal arc welding (GMAW) process and, in particular, to techniques for clearing a short circuit event.

BACKGROUND

In arc welding, a popular process is pulse welding. For example, gas metal arc welding, such as metal inert gas (MIG) welding, utilizes spaced pulses to first melt an end of an advancing wire electrode and then propel molten metal from the end of the wire through the arc to the workpiece. In ideal conditions, a droplet (e.g. a globule of molten metal) is transferred during each pulse of the pulse welding process. Traditionally, pulse welding processes utilize relatively high voltages and, accordingly, a gap between the end of the electrode and the workpiece may be relatively large. While this limits the incidence of short circuit and the resultant spatter or arc instability, travel speed is also limited.

There are benefits to operating a welding process, such as pulse welding, at short arc lengths. For example, a shorter arc length promotes lower heat input and higher travel speeds. Of course, the shorter arc length increases a possibility that partially transferred drops may bridge the gap between the electrode and the workpiece to cause a short circuit, leading to increased spatter and/or arc instability. To reduce spatter, instability, and/or poor weld quality, a short circuit clearing response is employed.

SUMMARY

The following summary presents a simplified summary in order to provide a basic understanding of some aspects of the (devices, systems and/or methods) discussed herein. This summary is not an extensive overview of the (devices, systems and/or methods) discussed herein. It is not intended to identify critical elements or to delineate the scope of such (devices, systems and/or methods). Its sole purpose is to present some concepts in a simplified form as a prelude to the more detailed description that is presented later.

In various embodiments, a time-based short circuit response is employed when a short circuit event occurs during a welding process. When a short circuit occurs, a time until a predetermined event in the welding process is determined. Based on the time remaining before the predetermined event, a particular short circuit response is executed.

In accordance with one aspect, a system is provided that includes a welding power supply that provides a welding output to an advancing wire electrode to produce an arc between the electrode and a workpiece. The system further includes a waveform generator configured to provide a welding waveform to the welding power supply, the welding power supply modulates the welding output in accordance with the welding waveform. In addition, the system includes a controller. The controller is configured to detect a short circuit condition between the electrode and the workpiece,

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein.

DETAILED DESCRIPTION

Figure 1:
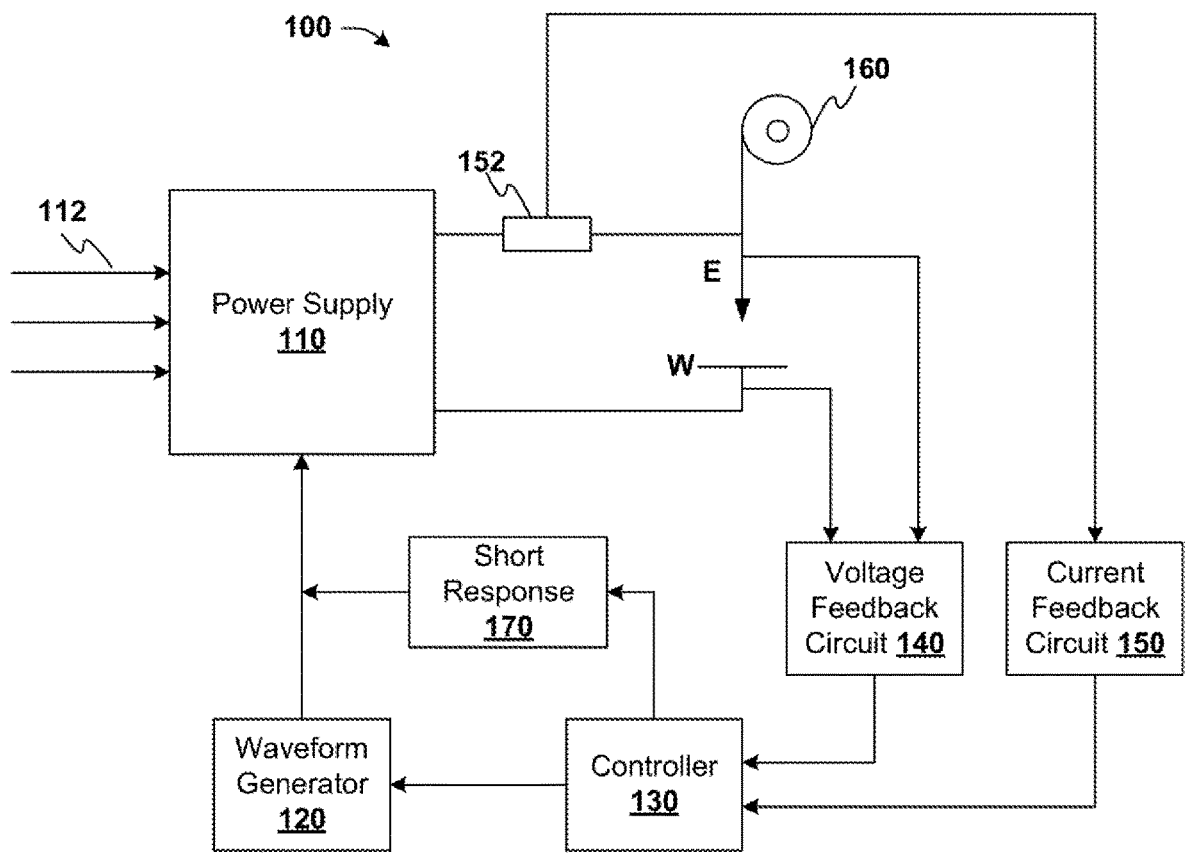
FIG. 1 is a schematic block diagram of an exemplary, non-limiting embodiment of welding system that implements a time-based short circuit response according to one or more aspects.

Embodiments of the invention relate to systems and methods for providing a time-based short circuit response during a welding process. In particular, when a short circuit is detected, an amount of time remaining before a target event (e.g. a reference event or reference point) of the welding process is determined. Based on the time remaining, a particular short circuit response is executed. The short circuit response is selected, for example, to ensure that the short circuit clears before the target event of the welding process. More generally, each short circuit response is associated with a respective expected time period required to clear a short circuit. If the expected time period for a given short circuit response exceeds the time remaining before the target event, that short circuit response is not executed.

In one example, the welding process may be pulse welding with a fixed frequency between peak pulses. In pulse welding processes with variable frequency, a short circuit event following a peak current pulse may delay an occurrence of a subsequent peak current pulse. With a fixed frequency, a delay does not occur. A short circuit should be cleared prior to a peak current pulse and not during the pulse in order to avoid explosive splatter, poor weld quality, and/or other instabilities and hazards. With fixed frequency pulse welding, a time until an occurrence of a next peak current pulse is known or readily determined. Accordingly, when a short circuit occurs, the short circuit response is chosen based on the time until the next peak current pulse. If sufficient time is available, a response that provides minimal spatter may be executed. If there is not enough time for an ideal response, a more aggressive short circuit response may be executed so that the short clears before the pulse.

Various embodiments will now be described with reference to the drawings, wherein like reference numerals are used to refer to like elements throughout. In the following description, for purposes of explanation, numerous specific details are set forth in order to provide a thorough understanding of the embodiments. It may be evident, however, that features described herein can be practiced without these specific details. Additionally, other embodiments are possible and the features described herein are capable of being practiced and carried out in ways other than as described. The terminology and phraseology used herein is employed for the purpose of promoting an understanding of the invention and should not be taken as limiting.

Turning initially to FIG. 1, illustrated is a schematic block diagram of an exemplary, non-limiting welding system 100 configured to execute a time-based short circuit response during a welding process. The welding system 100 is operatively coupled to a consumable welding electrode E and a workpiece W to perform the welding process. Welding system 100 includes a power supply 110 capable of converting an input power 112, which may be a three-phrase input, into a welding output power. The power supply 110 may be an inverter-type power converter or a chopper-type power converter, for example. The welding system 100 further includes a wire feeder 160 capable of feeding welding wire through, for example, a welding gun (not shown) that connects the welding wire (e.g., electrode E) to the welding output power.

The system 100 may also include a current shunt 152 (or similar device) operatively connected between the power supply 110 and the electrode E. The current shunt 152 provides a welding output current to a current feedback circuit 150 to measure the welding output current produced by the power supply 110. System 100 further includes a voltage feedback circuit 140 for sensing a welding voltage output by the power supply 110.

The welding system 100 includes a controller 130 that is operatively connected to the voltage feedback circuit 140 and the current feedback circuit 150. The controller 130 may receive a sensed current and a sensed voltage in the form of signals representative of the welding output. As shown in FIG. 1, the system 100 may also include a waveform generator 120 coupled to the controller 130. The waveform generator 120 outputs a welding waveform signal to the power supply 110. The power supply 110 generates a modulated welding output (e.g. voltage and current) by converting the input power 112 to a welding output power based on the welding waveform signal from the waveform generator 120. The waveform generator 120 receives command signals from the controller 130 and adapts a welding waveform signal, in real time, based on the command signals. The controller may include logic circuitry, a programmable microprocessor, and computer memory, in accordance with an embodiment.

According to an aspect, the controller 130 may use a voltage signal from the voltage feedback circuit 140, a current signal from the current feedback circuit 150, or a combination of the two signals to determine, during the welding process, when a short circuit occurs between the electrode E and the workpiece W, when a short is about to clear, and when the short actually clears. Exemplary techniques of determining when a short occurs and when a short clears are describes in U.S. Pat. No. 7,304,269, which is incorporated herein by reference in its entirety. The controller may command a short response circuit 170 to modify the welding waveform signal from the waveform generator 120 in response to detecting a short circuit. According to an aspect, the short response circuit 170 may output a partial waveform signal that adds to or combines with the welding waveform signal prior to input to the power supply 110. Thus, the power supply 110 modulates the welding output in accordance with an output from the short response circuit 170 and the welding waveform signal.

It is to be appreciated that the short response circuit 170 may be incorporated into the waveform generator 120. For example, the controller 130 may simply command the waveform generator 120 to modify the welding waveform signal when the short circuit occurs and/or when the short circuit clears.

It is to be appreciated that welding system 100 can utilize a measured parameter of the welding process in order to adjust a portion of a welding waveform generated by waveform generator 120. For example, the measured parameter can be a derivative of a welding parameter over time during the welding process such as, but not limited to, a derivative of current reading, a derivative of voltage reading, a derivative of resistance reading, a derivative of power, among others. Moreover, the derivative of the welding parameter can be detected in real time. The derivative of a welding parameter can be a trigger for a change in a welding process, a wavdorm, a portion of a waveform, a combination thereof, among others.

According to an aspect, when controller 130 detects that a short circuit occurs, the controller 130 can determine a particular short circuit response based on a time until a target event or reference point of a welding process is scheduled to occur. The short circuit response may be output from the short response circuit 170 or from the waveform generator 130. The target event may correspond to a portion of the welding waveform. For instance, the target event may be a peak current pulse. The short circuit response selected by the controller 130 is chosen to ensure the short clears prior to the target event. The short circuit response may include a relative increase or decrease in the welding output current, for example.

The controller 130 may command the waveform generator 120 or the short response circuit 170 to modify the waveform signal to effectuate an increase and/or decrease in the welding waveform current. Alternatively, the controller 130 may cause a current decrease more directly. For instance, a switching module may be operatively connected between the power supply 110 and the workpiece W or electrode E. The switching module can include an electrical switch (e.g. a power transistor circuit) in parallel with a resistive path. When no short circuit is present, the switch may be closed by a signal from the controller 130. When closed, the switching module provides a low resistance path. When a short occurs, the switch may be opened by the controller 130. When open, current is forced to flow through the resistive path, which results in a current level being reduced in accordance with a resistance of the resistive path. Thus, the controller 130, through command of such a switching module, can drive the current output down to a lower level in response to a short circuit in order to allow the short to clear.

The controller 130 can select a different response based on timing characteristics. For example, if the controller 130 determines that insufficient time remains before the target event such that the short cannot clear at a low current level (e.g., the background current or lower), the controller 130 may command the short response circuit 170 or the waveform generator 120 to boost the current output of the power supply 110 to more aggressively clear the short. The boost may be greater than the background current level but less than the peak current, for example.

Figure 2:
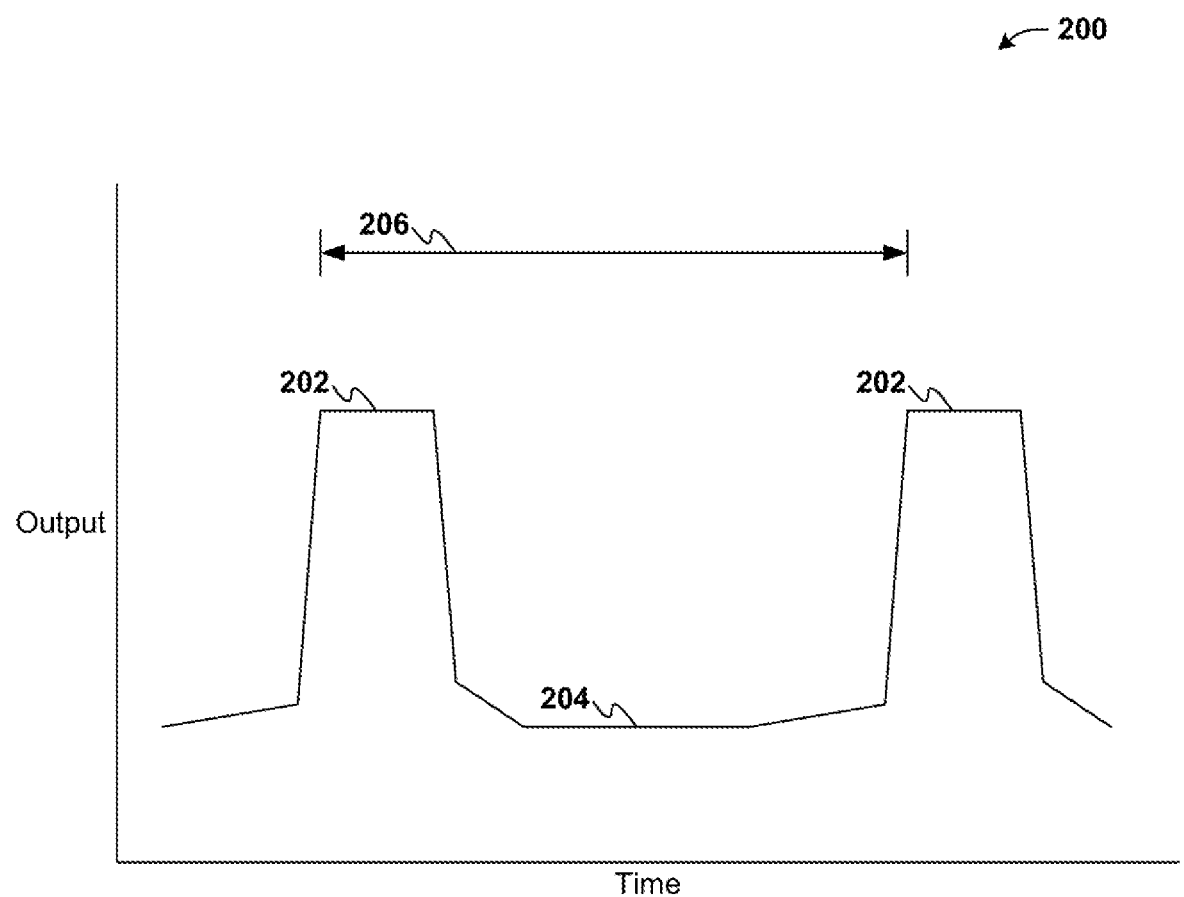
FIG. 2 is graph of an exemplary, non-limiting welding waveform in accordance with one or more aspects.
Figure 3:
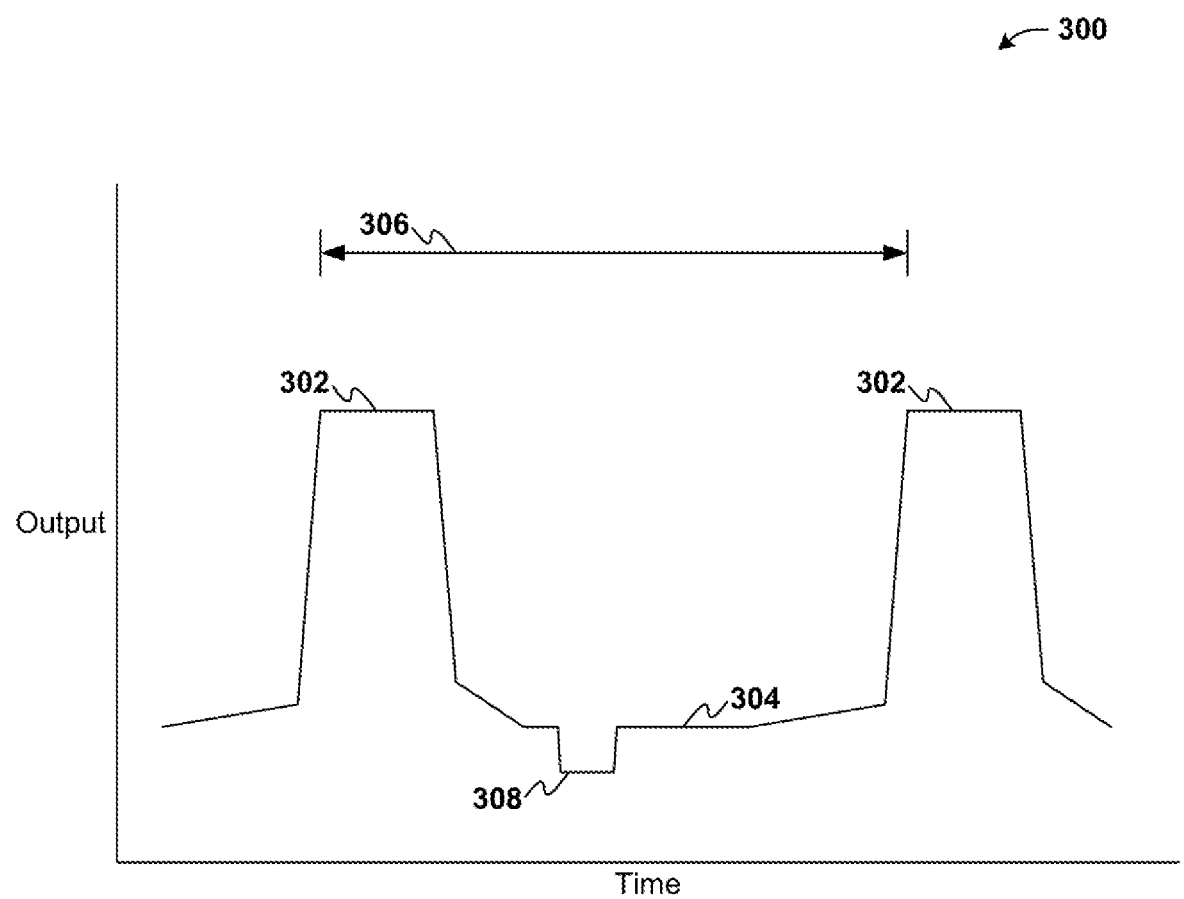
FIG. 3 is graph of an exemplary, non-limiting welding waveform in accordance with one or more aspects.
Figure 4:
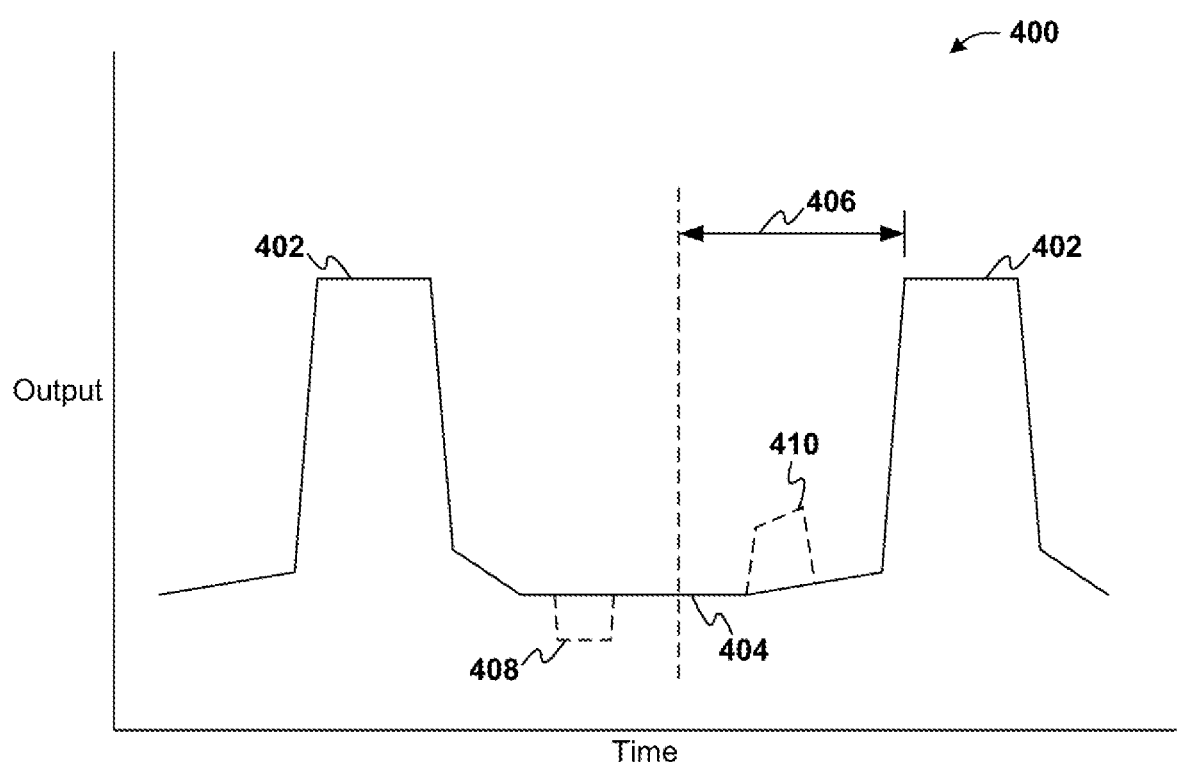
FIG. 4 is graph of an exemplary, non-limiting welding waveform depicting a time-based short circuit response in accordance with one or more aspects.

Turning to FIGS. 2-4, the time-based short circuit response will be described with reference to the illustrated graphs. The graphs of FIGS. 2-4 depict exemplary, non-limiting welding waveforms in accordance with various aspects. In FIG. 2, an ideal welding waveform 200 for a pulse welding process is illustrated. As shown, the waveform includes spaced peak current pulses 202 separated by background current portions 204. A time period 206 between pulses may be constant with fixed frequency welding processes. In FIG. 3, a welding waveform 300 illustrates a waveform similar to FIG. 2 such that peak current pulses 302 are separated by background current portions 304. Waveform 300 may also be a fixed frequency waveform such that pulses 302 occur in accordance with a constant time period 306. Waveform 300 includes a short circuit response illustrated as a reduced current portion 308. In accordance with the response shown in FIG. 3, the current is held low for a predetermined amount of time to enable the short to clear.

With the fixed time period 306, it is possible that a short occurs close to a peak current pulse 302 such that the short cannot clear before the pulse 302. This may lead to significant splatter and other weld quality concerns. Accordingly, as shown in FIG. 4, an alternative short circuit response may be executed. FIG. 4 illustrates a waveform 400 having peak current pulses 402 separated by background current portions 404. A threshold amount of time 406 is predetermined for the welding process. If a short occurs prior to the threshold, a first response 408 is executed. If the short occurs after the threshold, a second response 410 is executed. The second response 410, for example, may be a more aggressive response that attempts to clear the short quicker than the first response 408.

Figure 5:
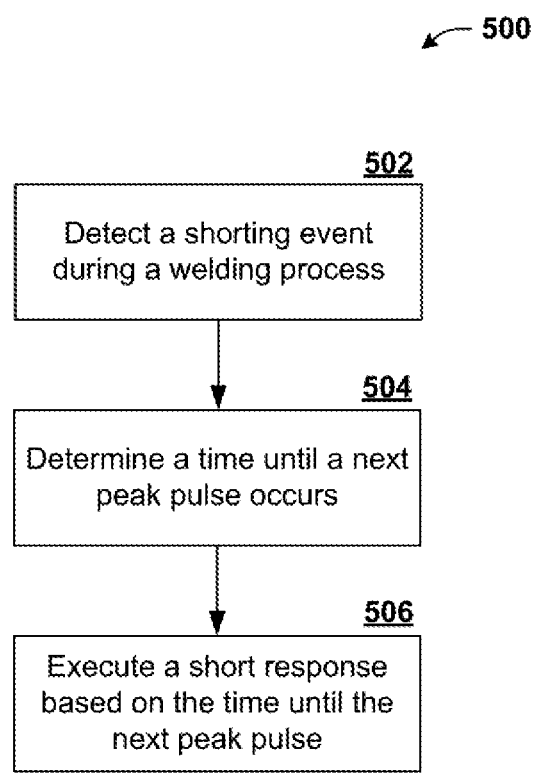
FIG. 5 is a flow diagram of an exemplary, non-limiting embodiment for a time-based short circuit response during a welding process in accordance with one or more aspects.
Figure 6:
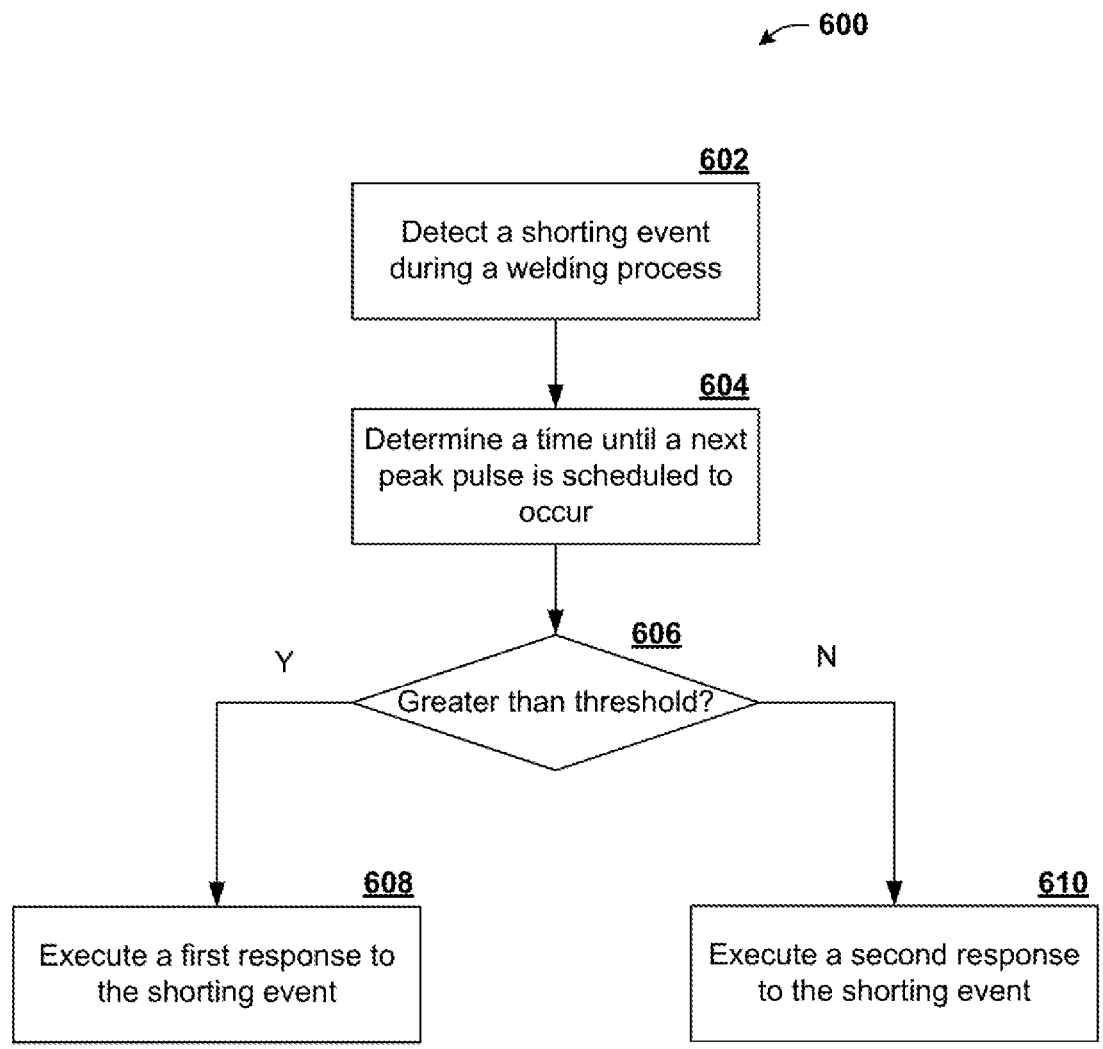
FIG. 6 is a flow diagram of an exemplary, non-limiting embodiment for a time-based short circuit response during a welding process in accordance with one or more aspects.

Turning now to FIGS. 5 and 6, methodologies described in connection with the illustrated flow charts relate to time-based short circuit responses. The methodologies described can be performed by a controller, a microprocessor, a FPGA, or logic circuit (such as controller 130) to execute a time-based response by a welding system (e.g., system 100) to a short circuit during welding process.

FIG. 5 illustrates a flow chart of a method 500 for clearing a short circuit based on time considerations. At 502, a short circuit event is detected during a welding process. For example, a short circuit may be detected by a drop in welding output voltage. At 504, a time until a target event of the welding process (e.g., target portion of a welding waveform) is determined. In an aspect, the target event generally represents a point by which the short circuit should be cleared. At 506, a short circuit response is carried out in dependence to the time determined at 504 to ensure the short circuit is cleared prior to the target event.

Turning to FIG. 6, a method 600 is illustrated. The method 600 can commence at 602 where a short circuit is detected. At 604, a time until a target event, such as a next peak current pulse, is determined. At 606, a determination is made as to whether the time until the target event is greater than a predetermined threshold. If the time remaining is greater, a first response to the short circuit is executed at 608. For example the first response can include reducing a current to a lower level to allow the short circuit to clear in the background. If the time remaining is less than the threshold, a second response to the short circuit is executed at 610. The second response may be a current boost that more aggressively clears the short circuit.

The examples described above detail embodiments having two responses. It is to be appreciated that additional responses may be available for selection by the welding system. These additional response may be respectively associated with timing criteria that determine their selection. For instance, multiple timing thresholds may be established to partition a given waveform. Different shorting responses may be employed depending in which partition a short circuit condition occurs. In another example, the welding process may have particular current and/or voltage settings that may also be considered in selecting a response. Accordingly, response selection may be based on parameter criteria in addition to timing criteria.

According to one embodiment, a system is provided that includes a welding power supply that provides a welding output to an advancing wire electrode to produce an arc between the electrode and a workpiece. The system also includes a waveform generator configured to provide a welding waveform to the welding power supply, the welding power supply modulates the welding output in accordance with the welding waveform. In addition, the system includes a controller. The controller is configured to detect a short circuit condition between the electrode and the workpiece, determine an amount of time remaining before a target event of the welding waveform, and signal the waveform generator to modify the welding waveform to execute a short circuit response based on the amount of time remaining.

According to various examples of this embodiment, the target event is a peak current pulse. The controller is further configured to compare the amount of timing remaining to a predetermined threshold. The controller is further configured to signal the waveform generator to execute a first short circuit response when the amount of time remaining exceeds the predetermined threshold. The first short circuit response holds a welding output current to a level at or below a background current of the welding waveform. The controller is further configured to signal the waveform generator to execute a second short circuit response when the amount of time remaining is less than the predetermined threshold. The second short circuit response increases a welding output current to clear the short circuit condition.

According to another embodiment, a method is provided. The method includes detecting a short circuit condition between an electrode and a workpiece during a welding process performed in accordance with a welding waveform. The method also includes determining a time between detection of the short circuit condition and a reference event of the welding waveform. The method further includes selecting a short circuit response based on the time determined and executing the short circuit response selected.

According to various examples, the welding waveform is a waveform for a fixed frequency pulse welding process. The reference event is a next peak current pulse of the welding waveform subsequent to the detection of the short circuit condition. Further, the method may include selecting the short circuit response comprises selecting one of a first short circuit response or a second short circuit response based on the time determined. The method also includes executing the first short circuit response by reducing a welding output current to less than or equal to a background level until the short circuit condition clears. Alternatively, the method may include executing the second short circuit response by increasing a welding output current above a background level until the short circuit condition clears. In this example, increasing the welding output current includes boosting the current to a level below a peak current level of the welding waveform. Still further, the method may include comparing the time determined to a threshold. Thus, the method may include executing a first short circuit response when the time determined exceeds the threshold, or executing a second short circuit response when the time determined is less than the threshold.

In yet another embodiment, a welding device is provided. The welding device includes a waveform generator configured output a welding waveform for a welding process. The welding device also includes a power supply configured to provide a welding power output to an electrode. The power supply modulates the welding power output based on the welding waveform from the waveform generator. The welding device also includes a short circuit response circuit configured to output a shorting response for clearing a short circuit between the electrode and a workpiece. In addition, the welding device includes at least one feedback circuit configured to measure at least one characteristic of the welding power output and generate a corresponding feedback signal. Further, the welding device includes a controller configured to detect a short circuit condition based at least in part on the feedback signal from the at least one feedback circuit, determine a time remaining before a target event of the welding waveform, select a short circuit response based on the time remaining, and signal the short circuit response circuit to exceed the short circuit response selected.

In an example, the controller is configured to select a first short circuit response when the time remaining is equal to or exceeds a threshold and to select a second short circuit response when the time remaining is less than the threshold. The first short circuit response operates by reducing the welding power output to less than or equal to a background level until the short circuit condition clears. The second short circuit response operates by increasing the welding power output to a level above the background level until the short circuit condition clears. In another example, the short circuit response circuit is configured output a signal that combines with the welding waveform output from the waveform generator.

The above examples are merely illustrative of several possible embodiments of various aspects of the present invention, wherein equivalent alterations and/or modifications will occur to others skilled in the art upon reading and understanding this specification and the annexed drawings. In particular regard to the various functions performed by the above described components (assemblies, devices, systems, circuits, and the like), the terms (including a reference to a "means") used to describe such components are intended to correspond, unless otherwise indicated, to any component, such as hardware, software, or combinations thereof, which performs the specified function of the described component (e.g., that is functionally equivalent), even though not structurally equivalent to the disclosed structure which performs the function in the illustrated implementations of the invention. In addition although a particular feature of the invention may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

The best mode for carrying out the invention has been described for purposes of illustrating the best mode known to the applicant at the time. The examples are illustrative only and not meant to limit the invention, as measured by the scope and merit of the claims. The invention has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof.

What is claimed is:

1. A system, comprising:
a welding power supply that provides a welding output to an advancing wire electrode to produce an arc between the electrode and a workpiece;
a waveform generator configured to provide a welding waveform to the welding power supply, the welding power supply modulates the welding output in accordance with the welding waveform, wherein the welding waveform comprises a plurality of peak current pulses at a fixed frequency, and a background current level between the peak current pulses; and
a controller configured to:
detect a short circuit condition between the electrode and the workpiece;
upon detecting the short circuit condition, determine an amount of time remaining before a next peak current pulse of the welding waveform, and compare the amount of time remaining to a predetermined threshold time; and wherein the controller is further configured to signal the waveform generator to execute a first short circuit response when the amount of time remaining exceeds the predetermined threshold time and wherein the first short circuit response reduces a welding output current to a level at or below the background current level, and wherein the controller is further configured to signal the waveform generator to execute a second short circuit response when the amount of time remaining is less than the predetermined threshold time, and wherein the second short circuit response increases the welding output current above the background current level to clear the short circuit condition.

2. The system of claim 1, wherein the short circuit condition is detected from a drop in welding output voltage.

3. The system of claim 1, wherein the background current level is less than a current level of the peak current pulses.

4. A method for welding equipment, comprising:
outputting a welding waveform to a welding electrode, wherein the welding waveform comprises a plurality of peak current pulses at a fixed frequency, and a background current level between the peak current pulses;
detecting a short circuit condition between the welding electrode and a workpiece during a welding process performed in accordance with the welding waveform;
determining a time remaining between detection of the short circuit condition and a next peak current pulse of the welding waveform;
comparing the time remaining to a predetermined threshold time;
selecting one of a first short circuit response and a second short circuit response different from the first short circuit response based on a result of comparing the time remaining to the predetermined threshold time;
executing the first short circuit response when the time remaining exceeds the predetermined threshold time, wherein the first short circuit response reduces a welding output current to a level at or below the background current level; and
executing the second short circuit response when the time remaining is less than the predetermined threshold time, and wherein the second short circuit response increases the welding output current above the background current level to clear the short circuit condition.

5. The method of claim 4, wherein the short circuit condition is detected from a drop in welding output voltage.

6. The method of claim of claim 4, wherein the background current level is less than a current level of the peak current pulses.

7. The method of claim 6, wherein increasing the welding output current above the background current level comprises boosting the current to a level below the current level of the peak current pulses.

8. A welding device, comprising:
a waveform generator configured output a welding waveform for a welding process, wherein the welding waveform comprises a plurality of peak current pulses at a fixed frequency, and a background current level between the peak current pulses;
a power supply configured to provide a welding power output to an electrode, the power supply modulates the welding power output based on the welding waveform from the waveform generator;
a short circuit response circuit configured to output a shorting response for clearing a short circuit between the electrode and a workpiece;
at least one feedback circuit configured to measure at least one characteristic of the welding power output and generate a corresponding feedback signal; and
a controller configured to:
detect a short circuit condition based at least in part on the feedback signal from the at least one feedback circuit;
upon detecting the short circuit condition, determine a time remaining before a next peak current pulse of the welding waveform, and compare the time remaining to a predetermined threshold time;
select one of a first short circuit response and a second short circuit response different from the first short circuit response based on a result of comparing the time remaining to the predetermined threshold time; and
wherein the controller is further configured to signal the short circuit response circuit to execute the first short circuit response when the time remaining exceeds the predetermined threshold time and wherein the first short circuit response holds a welding output current to a level at or below the background current level, and
wherein the controller is further configured to signal the short circuit response circuit to execute the second short circuit response when the time remaining is less than the predetermined threshold time, and wherein the second short circuit response increases the welding output current above the background current level to clear the short circuit condition.

9. The welding device of claim 8, wherein the short circuit condition is detected from a drop in welding output voltage.

10. The welding device of claim 9, wherein the background level is less than a current level of the peak current pulses.

11. The welding device of claim 8, wherein the short circuit response circuit is configured output a signal that combines with the welding waveform output from the waveform generator.

12. The welding device of claim 8, wherein increasing the welding output current above the background current level comprises boosting the welding output current to a level below a current level of the peak current pulses.

13. The system of claim 3, wherein increasing the welding output current above the background current level comprises boosting the welding output current to a level below the current level of the peak current pulses.

* * * * *